United States Patent
Freser-Wolzenburg et al.

(10) Patent No.: US 8,080,193 B2
(45) Date of Patent: Dec. 20, 2011

(54) METHOD FOR THE PRODUCTION OF A SOUND INSULATION MOLDING WITH MASS AND SPRING

(75) Inventors: Thomas Freser-Wolzenburg, Adelheidsdorf (DE); Eberhard Puschmann, Nienhagen (DE); Georg-Wilhelm Prahst, Lauenau (DE); Maik Grossmann, Adelheidsdorf (DE)

(73) Assignee: Stankiewicz GmbH, Adelheidsdorf (DE)

(*) Notice: Subject to any disclaimer, the term of this patent is extended or adjusted under 35 U.S.C. 154(b) by 851 days.

(21) Appl. No.: 11/659,990

(22) PCT Filed: Aug. 9, 2005

(86) PCT No.: PCT/EP2005/008642
§ 371 (c)(1),
(2), (4) Date: May 27, 2008

(87) PCT Pub. No.: WO2006/018190
PCT Pub. Date: Feb. 23, 2006

(65) Prior Publication Data
US 2009/0110902 A1    Apr. 30, 2009

(30) Foreign Application Priority Data

Aug. 13, 2004 (DE) .......................... 10 2004 039 438

(51) Int. Cl.
*B32B 37/00* (2006.01)
(52) U.S. Cl. ...................................... 264/45.6; 264/45.5
(58) Field of Classification Search .................. 264/45.5, 264/45.6
See application file for complete search history.

(56) References Cited

U.S. PATENT DOCUMENTS 4,663,381 A * 5/1987 Blumel et al. ............... 524/426
4,800,984 A   1/1989 Kerman et al.
4,839,397 A * 6/1989 Lohmar et al. ............... 521/159
5,662,996 A   9/1997 Jourquin et al.
6,419,863 B1 * 7/2002 Khac ........................... 264/46.6
2004/0150128 A1 8/2004 Houyoux et al.
2005/0202181 A1 9/2005 Grossmann

FOREIGN PATENT DOCUMENTS

DE    2800914 A1    7/1979
(Continued)

OTHER PUBLICATIONS

International Search Report for PCT/EP2005/008642 mailed Nov. 30, 2005 (English).

*Primary Examiner* — Joseph Del Sole
*Assistant Examiner* — David N Brown, II
(74) *Attorney, Agent, or Firm* — Grossman, Tucker, Perreault & Pfleger, PLLC

(57) ABSTRACT

A method of producing a sound insulation molding with mass and spring, wherein both mass and spring are produced on the basis of the same material, in particular polyurethane. For the formation of a mass, reaction substances and fillers are brought into a mold, in particular sprayed in or injected, and brought to reaction. The spraying in or injection is thereby controlled such that the reaction substances and the fillers are supplied in locally different quantity and/or composition into the mold, dependent upon the sound damping to be locally achieved together with the spring, which is then formed on the so-formed mass in the same mold through formation of foam. Through this, with surfaces to be sound insulated which are of the same geometry, three-dimensional moldings of the same geometry can be produced with both different acoustic and also mechanical behavior in predetermined series.

8 Claims, 3 Drawing Sheets

FOREIGN PATENT DOCUMENTS

| | | |
|---|---|---|
| DE | 693 15 693 T2 | 4/1998 |
| DE | 199 58 663 A1 | 6/2001 |
| DE | 101 61 600 A1 | 7/2003 |
| EP | 0 882 561 A | 12/1998 |
| EP | 0 922 497 A2 | 6/1999 |
| EP | 0 997 255 B1 | 1/2003 |
| EP | 1 237 751 | 3/2006 |

* cited by examiner

METHOD FOR THE PRODUCTION OF A SOUND INSULATION MOLDING WITH MASS AND SPRING

BACKGROUND OF THE INVENTION

1. Field of the Invention

The invention relates to a method for the production of a sound insulation molding with mass and spring, such a sound insulation molding, and the use thereof.

2. Related Technology

From EP 0 882 561 A1 there is known a method for the production of a sound insulation molding with mass and spring, with which both the mass and the spring are produced on the basis of the same material, namely polyurethane. For the formation of a mass, reaction substances and fillers are sprayed or injected into a mold and brought to reaction, whereby by means of a die there is attained a forming of the mass as a mass layer. Foam is then formed in the same mold, as a spring on the mass, and this by means of a second molding through which the mass layer is foamed on the back.

With the known approach a continuous mass layer with essentially uniform thickness is obtained, whereby with appropriate configuration the side which is to be seen can in particular have the shape of individual profiles in the manner of grooves or ribs. The spring, or foam layer, can likewise be shaped. Through this the molding can be adapted to certain developments of a surface to be sound insulated, to which the molding is to be attached.

The outlay of materials required in the production of the mass or heavy layer is substantial and thus cost-intensive. In addition, a somewhat economic production is possible only in the case of large quantities. Typical moldings of the described type are used in vehicles, in particular cars. Cars are offered, with the same bodywork construction, with very different engines, so that in the configuration of the molding and thereby in particular the mass or heavy layer the most unfavorable constellation of an engine as a sound generator and surface to be sound damped by the molding must be taken into account.

SUMMARY OF THE INVENTION

Starting from this, the invention provides an approach by means of which a high sound insulation or soundproofing effect can be attained with low outlay of materials.

Accordingly, the invention provides a method of producing a sound insulation molding with mass and spring, wherein both mass and spring are produced on the basis of the same material, wherein for the formation of a mass, reaction substances and fillers are brought into a mold, and brought to reaction and then foam as a spring is formed on the mass in the same mold.

In accordance with the invention the spraying in is controlled so that for the formation of the mass the reaction substances and the fillers are supplied into the mold locally in different quantity and/or composition, and this in dependence upon sound damping to be locally achieved together with the spring.

The invention thereby starts from the knowledge that a surface activated by a sound generator transfers the sound very differently, essentially dependent on frequency but also partly in dependence upon location. In turn from this results that there is an optimal mass-spring combination for each surface region of a surface to be sound insulated, within the scope of production tolerances. The outlay of materials for the mass can therefore be optimized and with this for the molding as a whole. It is solely required to control the devices which bring about the spraying in or injection of the various materials for mass and spring so appropriately that locally the reaction substances (including expanding agents) and the fillers for the formation of the mass or heavy layer are delivered with the locally required quantity and composition. The filler content can in particular be varied in a simple way, typically between 0 and 50 volume percent, the quantity of the supplied reaction substances can be varied such that different thicknesses of the mass or heavy layer are achieved, typically 0.5 mm and more (absolutely also 10 mm), and the makeup of the reaction substances can typically be adapted, for example for polyurethane materials over the complete range which is known from polyurethane chemistry.

Furthermore it is possible by further measures not only to have influence on the acoustic characteristics but also on mechanical characteristics such as mechanical strength or elasticity. For example, where in the finished manufactured molding through-openings are to be provided the mechanical strength can be increased, whilst where in the finished manufactured molding thick edges to other parts should be provided, the elasticity should be higher. In particular manner this can be achieved without impairment of the sound engineering or acoustic characteristics in that, with the retention of the same density, locally neighboring regions have different compositions of the reaction substances employed.

It turns out that the control of the devices delivering the materials is typically carried out automatically by means of computer control as this is in principle per se known for robot control. In turn from this results that the course of the control can be adapted quickly to changed conditions such as the assignment of another sound generator to a surface to be sound insulated. It is even possible therefore not only to produce small lots but also individual moldings in the desired number and order, as this is desired in just-in-time production. It can suffice for moldings identical in geometry, depending upon the quantity to be produced per unit time, to provide one single molding tool. Dependent on the size of the molding it may therefore even be possible to provide a mobile production facility which can flexibly be put to use on the spot.

In particular with the employment of exclusively PUR materials, due to the possibility of manufacturing individual moldings, special wishes can be taken into account, for example with regard to the color design.

BRIEF DESCRIPTION OF THE DRAWINGS

The invention is explained in more detail with reference to the exemplary embodiments illustrated in the drawings. There is shown.

DETAILED DESCRIPTION

Figure 1:
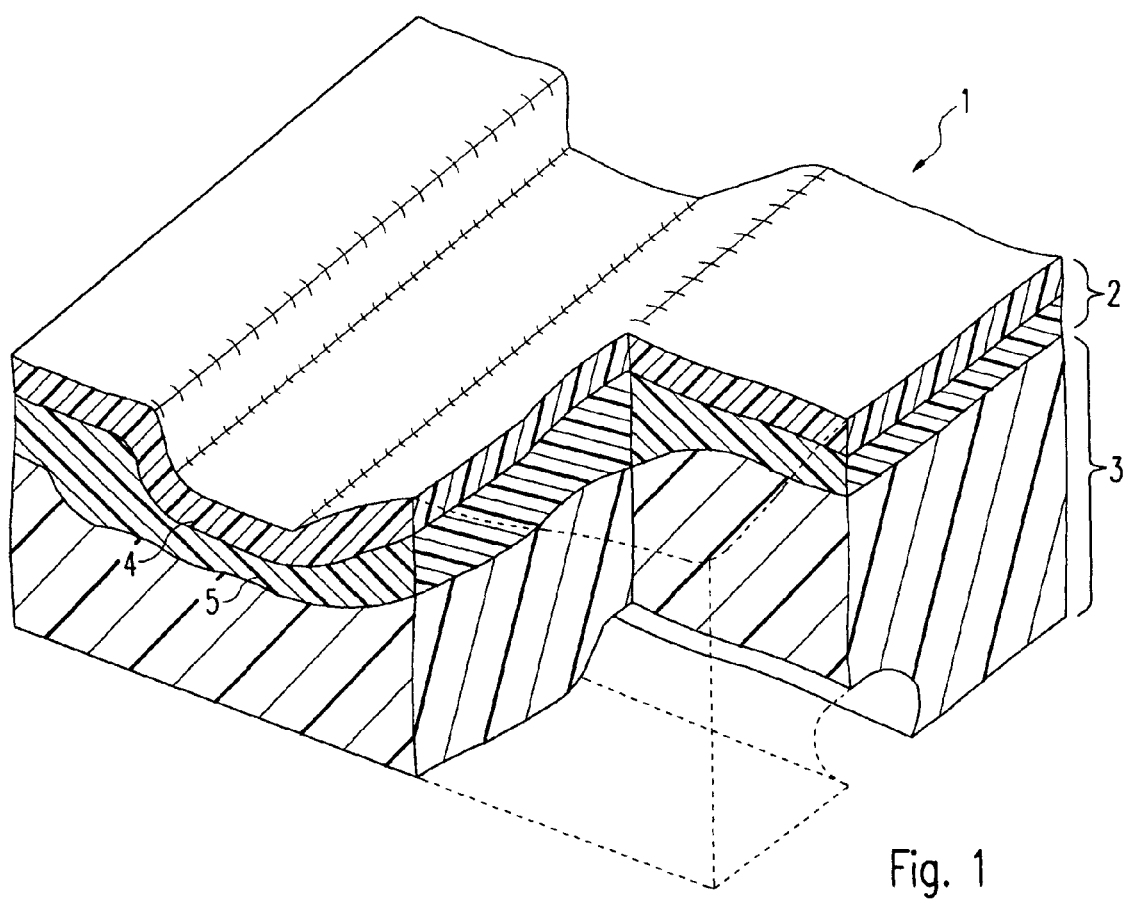
FIG. 1 is an isometric view and in section, the basic construction of a molding producible in accordance with the invention.

FIG. 1 shows a detail section through a molding 1 comprised of a mass 2 or heavy layer and a spring 3 or foam layer having the same material construction, preferably polyurethane.

A mass 2 or heavy layer typically is cell-poor or cell-less and has a high weight per unit area which in substance is caused by fillers. The spring 3 or foam layer is, in contrast, rich in cells, has a low or not the slightest filler content and thus has a low weight per unit area.

The mass 2 and the spring 3 act in combination in a per se known way to achieve sound damping. Furthermore thickness and density as well as porosity have influence on the mechanical properties of the molding 1 at a certain location, as is also per se known.

FIG. 1 illustrates schematically how, at a certain location of the molding 1 corresponding to the detail, the mass 2 is locally acted upon. In the exemplary embodiment the mass 2 is comprised of two discrete mass layers 4 and 5. The first mass layer 4 can be provided for the complete molding 1 throughout in the same manner and define a carrier layer which influences the substantive mechanical properties. The second discreet mass layer 5 is locally applied so that the mass 2 is formed locally by the two layers 4 and 5. The second discreet mass layer 5 can, but need not, have the same composition with regard to the reaction substances and the quantity of filler as the first discreet mass layer 4 and therefore be produced as a unit in the same working procedure. It also can be additionally applied after formation of the first discreet mass layer 4 in a mold according to the local conditions. From the above it follows that this local discreet second mass layer 5 can be formed also based on another composition of the reaction substances and/or another quantity of filler.

The procedures upon allowing the reaction substances to react, taking into consideration take-up of fillers, determine in the end whether it is more expedient for a certain location of the molding 1 to form the mass 2 as a plurality of layers, in the exemplary embodiment as two successive layers 4, 5, or in the form of a single layer, whereby the development of their thicknesses and densities is independent of each other. After formation of the mass 2 the spring 3 is generated in conventional manner by back foaming.

Since a surface to be sound insulated normally has a very complicated three-dimensional shape, the formation of the mass 2, which must be contour-following, is effected expediently and in accordance with the invention directly in a mold-half of a mold shaped after the surface to be sound insulated. The formation of the foam layer of the spring 3 can then be carried out either in open or in closed mold, whereby the latter makes sense if the side of the spring 3 away from the mass 2 is to be or must be structured.

The molding 1 can therefore be produced with the mass 2 and the spring 3 in one working procedure.

It turns out that the formation of the mass 2 can be effected also against a decorative part placed in a mold such as a carpet cutting or a web of material, but also the formation of the spring 3 can be effected between the mass 2 and a decorative part such as a carpet cutting or a web of material.

Figure 2:
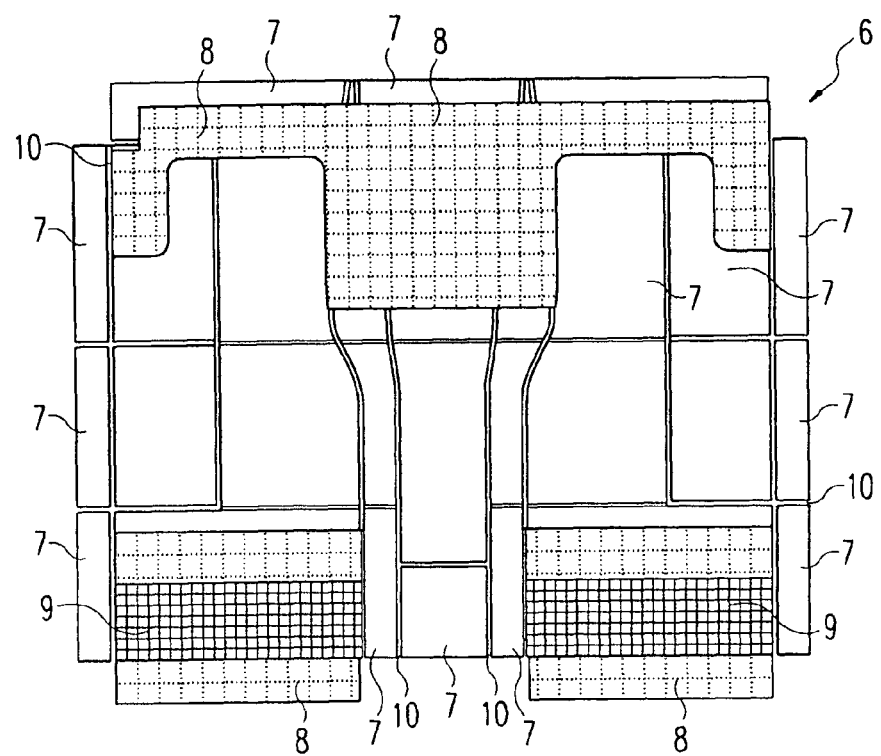
FIG. 2 shows schematically, in a view from above, a development of a molding with indication of different masses or heavy layer sections to be attained in accordance with the invention.

FIG. 2 shows the development 6 of a molding, in which surface regions are indicated whose occupancy with mass 2 is different. In surface regions 7, 8, and 9, defined by different shadings or hatching, different weights per unit area (or densities) of the mass 2 and/or different thicknesses of the mass 2 are to be realized. In the development 6 regions which are similarly hatched or shaded are separated from each other by channel-like structures 10. Through this it is illustrated that in the application of the mass 2 in the appropriate surface regions of the real mold for the formation of the real molding, expediently different application procedures are to be provided due to the three-dimensional conditions, for example by means of other devices for the supply of the reaction substances and fillers or by means of a setting of the spatial disposition of the devices for the introduction of the reaction substances and the fillers that is to be adjusted.

Furthermore, from the above explanation it is apparent that, in considerably greater variety than indicated by FIG. 2, surface regions can be provided at which there can be achieved a structure differing in its composition determined by the reaction substances and quantity of filler, and also in its thickness, in the mass 2 formed overall over the molding.

Figure 3:
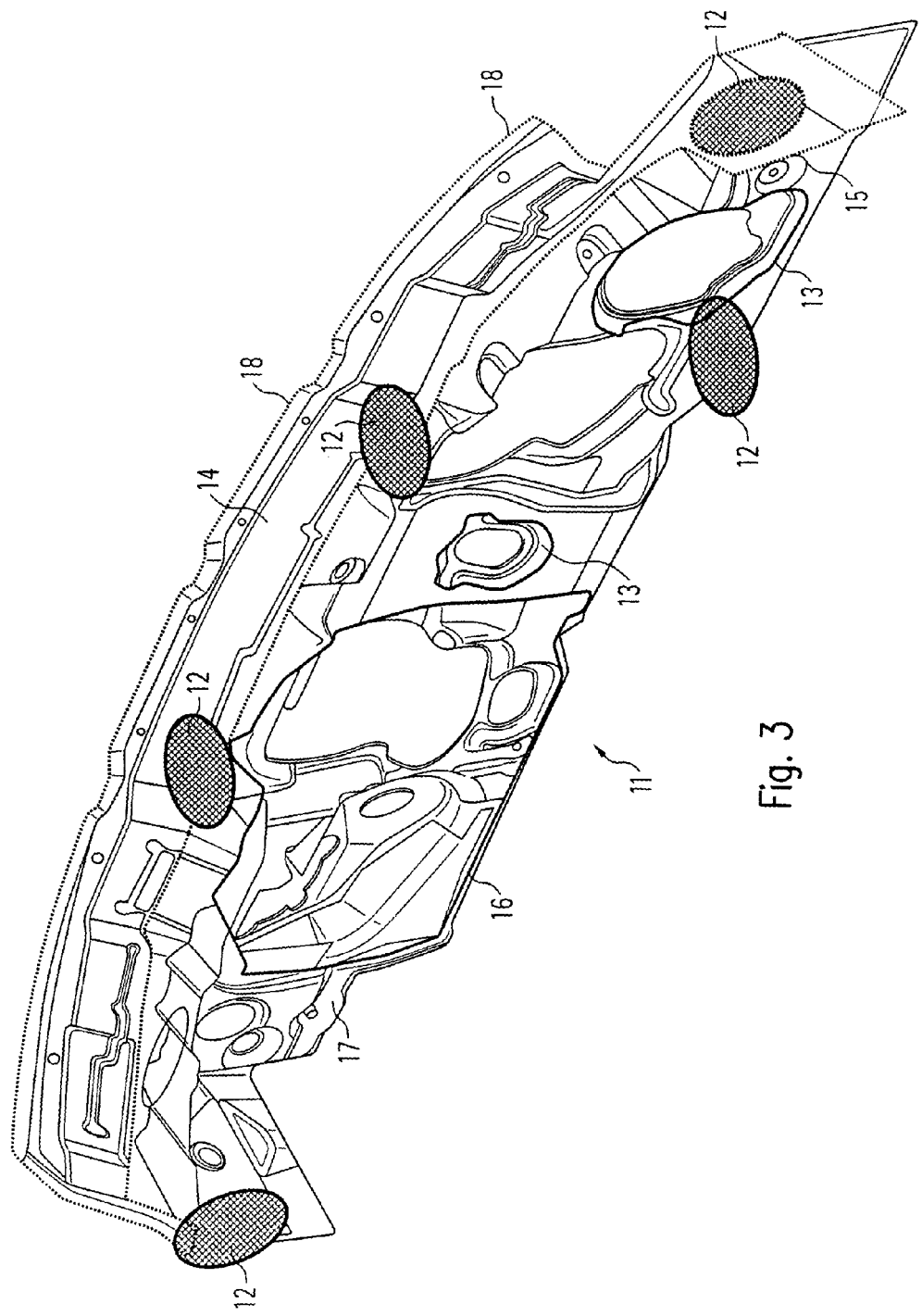
FIG. 3 is a perspective view of a complicatedly formed body part as an example of a sound insulating surface with indication of surface sections in which certain mechanical characteristics in addition to acoustic characteristics are to be attained, as is possible by means of the invention.

FIG. 3 shows schematically in a perspective view the complicated three-dimensional construction of a surface to be sound insulated—to be more precise, as an example, an end wall 11 of a typical motor vehicle. A non-illustrated molding, which is be applied in form-fitting manner to this end wall 11, is to have locally different characteristics which are illustrated by different borders and shadings. This involves combinations of both mechanical characteristics which can be represented by words and acoustic characteristics which are definable by masses per unit area or weight per unit area. The details are of course exemplary and real moldings, to be assigned to an arbitrary end wall 11, can have both mechanical and acoustic characteristics which strongly deviate locally. In the example surface regions 12 are to have high strength with a weight per unit area of about 1 kg/m$^2$, surface regions 13 are to be soft elastic with a weight per unit area of 2 kg/m$^2$, surface regions 14 are to be overall light weight with a weight per unit area of 1 kg/m$^2$, surface regions 15 are to have both high strength as well as being hard and have a weight per unit area of for example 4.5 kg/m$^2$, surface regions 16 are to be heavy with a weight per unit area of about 4.5 kg/m$^2$, remaining surface regions 17 are to have a weight per unit area of 2 kg/m$^2$ without predetermined mechanical properties, and regions 18 are to be soft elastic with a weight per unit area of 1 kg/m$^2$ and be formed to a run-out lip. From the above it arises that a mass 2 must be provided throughout with a weight per unit area of at least 1 kg/m$^2$, whereby locally higher weights per units area are to be provided, wherein furthermore locally additional certain mechanical characteristics are to be attained.

The mechanical properties are on the one hand possible by influencing the local composition of the reaction substance mixtures and the type and the proportion of the solid substances, but also by action on the foam formation. The latter is for example possible in the manner and way explained in EP 1 237 751 A1. Influence can, however, also be exercised in other manners and ways on the mechanical properties.

Figure 4:
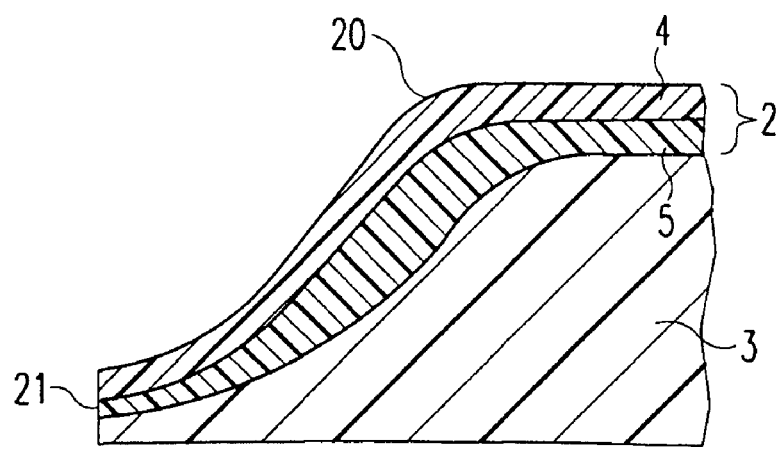
FIG. 4 shows application of the method according to the invention in the configuration of edges for e.g. through-openings
Figure 5:
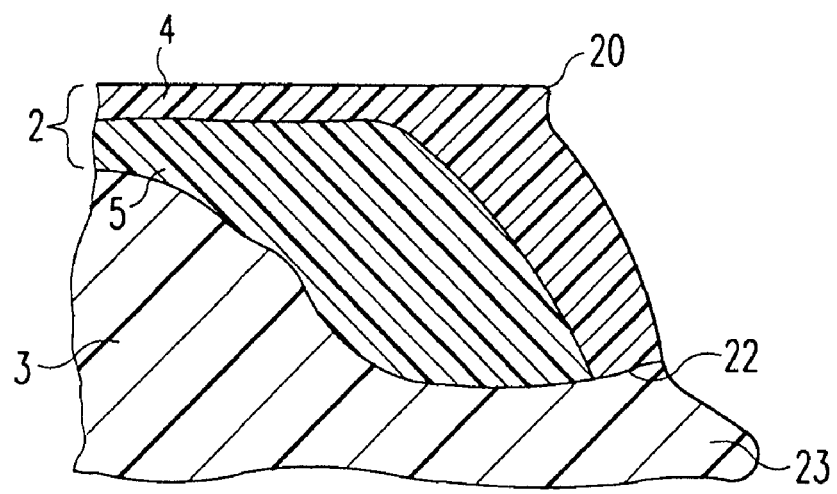
FIG. 5 shows in a view similar to that of FIG. 4, the application of the invention in the configuration of elastic edges or lips.

FIG. 4 and FIG. 5 show in section how by influencing the mass at peripheries and edges the mechanical properties thereof can be influenced. Thereby it is to be noted that the acoustic characteristics are of rather subordinate importance there.

Similarly to FIG. 1, FIG. 4 shows in the case of a molding 1 comprised of mass 2 and spring 3 a physically distinctive edge 20 in the region of which both first discreet mass layer 4 and second discreet mass layer 5 are formed considerably more thickly than in adjacent regions. In an outer edge region 21 in the case of which no further foam 3 can, if applicable, be provided for instance to define through openings, comparatively high stiffness is achieved in cooperation with the edge 20.

Similarly to FIG. 4, FIG. 5 also shows a distinctive edge 20, whereby the two layers 4 and 5 of the mass 2 end within the molding, as illustrated at 22, such that the foam of the spring 3, as illustrated at 23, forms a lip extending outwardly, which upon bearing on concrete elements can achieve an elastic termination.

Thus, in one mold, whose under-mold has a development adapted to a surface to be sound insulated, there can be associated moldings individually formed in accordance with the invention, as desired.

Thereby there can be associated with a mold one or also several devices by means of which the supply of the reaction substances is adjustable in a way permissible for the production of the product, in selectable manner in accordance with quantity and proportions, whereby also fillers can be mixed in within the permitted range. An approach can for example be used in accordance with DE 101 61 600 A1, which permits the variable and simultaneous application of fillers into a reaction substance mixture spray.

The invention is in particular applicable to the production of moldings for motor vehicles, in particular motor cars. As is known, bodywork constructions, identical at least in sections, are associated with a variety of different engines. This means, however, that the different engines, as sound generators, can excite in different ways, possibly in extremely different ways, surfaces to be sound insulated, both with regard to the transferred frequencies and also the respective intensity thereof, and also with regard to the disposition of the locations of maximum sound transmission. Thereby, the conditions can change in the case of different vehicle types (such as car, convertible, estate car) for such body parts which are formed geometrically like, such as for example an end wall 11 in accordance with FIG. 3 between passenger space and engine compartment. On the other hand experience has shown that the association of a body part to a certain engine and therewith to a certain sound generator (with the same vehicle type), leads to a large extent to similar sound transmission conditions in the case of a surface to be sound insulated. By means of the invention there can therefore be attained on the one hand in simple manner an optimal acoustic design of a molding, taking into consideration mechanical specifications, whereby on the other hand a considerable material saving is already possible because the material can be adapted optimally for the mass and the mass has the largest material component.

Since in accordance with the invention this optimization is possible for each of the possible associations of a geometrically similar surface to be sound insulated with a sound generator, namely an engine, taking into consideration also the vehicle type, based on the same mold, which constructionally corresponds to the surface to be sound damped, each necessary molding can be produced optimally, individually and as required.

The method according to the invention therefore is also suitable for the production of small lots and in particular also for making available moldings identical in geometry of different construction in a predetermined order, as this is required for example for just-in-time production.

The at least one device for the introduction of the reaction substances and fillers into the mold for the production of the mass 2 is expediently controlled automatically in the manner of a robotic control, whereby programs for the automatic control of robots which serve for the coating of complicated three-dimensional areas, in principle for painting, are per se known. Additionally, however, there must be taken into account in the programming on the one hand the locally differing mixture, obtained by means the invention, of the supplied reaction substances for the attainment of the local mechanical and acoustic characteristics, as well as on the other hand also the necessary thickness of the mass 2 to be attained.

Firstly, a prototype of the surface to be sound insulated is examined together with a prototype of a sound generator with regard to the sound transfer behavior, for the mentioned typical employment of moldings produced according to the invention. It is then determined which surface regions of the surface to be sound insulated require a damping going beyond a minimum damping. Starting out from mechanical specifications and spatial specifications provided by the customer with regard to the design of the molding, in particular on the side away from the surface to be sound insulated, the ideal construction of a molding can then be determined. A classification can be carried out over surface regions in practice, since on the one hand production tolerances are taken into account or must be accepted in the production of the surface to be sound insulated and of the sound generator and on the other hand working tolerances in the control of the devices for the introduction of the reaction substances and fillers are taken into account or must be accepted. There is therefore provided an assignment and classification as has been explained with reference to FIG. 3. A set of parameters or a parameter matrix can thus be produced, which are specified for the predetermined association of a certain sound generator with the surface to be sound insulated, which allows the specific control of the at least one device for the introduction of the reaction substances (including expanding agents) and fillers.

This investigation and assessment and classification can now be carried out now for each association of the geometrically identical surface to be sound insulated with a different sound generator. Facilitation can be provided in the context of the investigation and assessment if the different sound generators are of similar type, as can be the case for example with car engines of different cubic capacities and the same mounting disposition. It can thereby arise that for several different sound generators in substance the same classifications arise, under consideration of the mentioned necessary tolerances. This would make the programming effort easier.

The various different control programs for the control of the at least one device for the introduction of the reaction substances and fillers into the mold corresponding to a predetermined surface to be sound insulated then can be called up freely selectably and used for the production of individual moldings.

Since in particular in the case of polyurethane materials there are typically involved pumpable starting products for the reaction substances (polyols, isocyanates, and expanding agent) and fillers, an apparatus for carrying out the method, that is for the production of moldings formed according to the invention, can be constituted as a mobile unit, insofar as the geometry the molding and thus of the mold allows this.

Furthermore it is possible bring into a mold also third party components such as additional construction elements before, during or after the formation of the mass 2 in a mold, if this is necessary or is wished by the customer.

Finally, since the same materials are used for both mass and spring the recycling ability is increased considerably.

The invention claimed is:

1. A method of producing a sound insulation molding comprising a mass and a spring formed of the same material for sound insulating a surface, said method comprising the steps of:
   (a) determining local areas of said surface that require different degrees of sound damping to control sound transfer;
   (b) introducing reaction substances and fillers into a mold and reacting the reaction substances to form a mass of foam, wherein the mass has two layers that each vary in thickness and/or composition in local areas of the mold to vary local acoustic and mechanical characteristics of the sound insulation, wherein the mass has a weight per unit area of 1 kg/m$^2$ to 4.5 kg/m$^2$ at thicknesses of 0.5 mm to 10 mm and wherein said local areas of the mold correspond to said local areas of said surface and wherein said mass layer has a relatively higher weight per unit area due to fillers and wherein said spring has a relatively low weight per unit area due to a relatively lower proportion of fillers; and,
   (c) forming said foam spring on the mass in the same mold using the same reaction substances as used to form the mass.

2. Method according to claim 1, wherein step (b) comprises spraying the reaction substances and fillers against a decorative part previously placed in the mold to form the mass.

3. Method according to claim 1, wherein step (b) comprises spraying the reaction substances and the fillers into the mold by physically separate spraying devices.

4. Method according to claim 1, wherein step (b) comprises spraying the reaction substances and the fillers into the mold by a single spraying device that effects intermixing.

5. Method according to claim 1, comprising controlling the formation of the mass such that the reaction substances and the fillers are delivered into the mold in different quantity and/or composition in the local areas of the mold.

6. Method according to claim 1, comprising controlling the forming of the spring such that the reaction substances and the fillers are delivered into the mold in different composition and/or quantity in the local areas of the mold.

7. Method according to claim 1 comprising controlling the reaction substances and the fillers such that in the case of the mass or spring there is attained substantially a same density in the local areas of the mold as areas surrounding the local areas.

8. Method according to claim 1, comprising before, during, or after formation of the mass, bringing insulating construction elements into the mold at predetermined locations.

* * * * *